(12) United States Patent
Adesanya et al.

(10) Patent No.: US 11,988,406 B2
(45) Date of Patent: May 21, 2024

(54) RETURN AIR GRILLE AIR PURIFIER

(71) Applicant: Carrier Corporation, Palm Beach Gardens, FL (US)

(72) Inventors: Oludamilola Adesanya, Avon, IN (US); Peter Johannes McKinney, Boulder (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 305 days.

(21) Appl. No.: 17/478,065

(22) Filed: Sep. 17, 2021

(65) Prior Publication Data

US 2022/0090817 A1    Mar. 24, 2022

Related U.S. Application Data

(60) Provisional application No. 63/080,507, filed on Sep. 18, 2020.

(51) Int. Cl.
| | |
|---|---|
| *B01D 46/00* | (2022.01) |
| *B01D 46/10* | (2006.01) |
| *B03C 3/155* | (2006.01) |
| *F24F 13/08* | (2006.01) |
| *F24F 13/28* | (2006.01) |

(52) U.S. Cl.
CPC ........ *F24F 13/085* (2013.01); *B01D 46/0005* (2013.01); *B01D 46/10* (2013.01); *F24F 13/084* (2013.01); *F24F 13/28* (2013.01)

(58) Field of Classification Search
CPC .... B01D 46/0005; B01D 46/10; B03C 3/155; B03C 3/38; B03C 3/12; B03C 3/41; B03C 3/47; B03C 2201/10; F24F 13/085; F24F 13/084; F24F 13/28; F24F 8/30; F24F 8/192
USPC ......... 55/490, 495, 497, 496, 498, 499, 521, 55/DIG. 5, DIG. 31
See application file for complete search history.

(56) References Cited

U.S. PATENT DOCUMENTS 3,052,372 A * 9/1962 Shepherd ................ F21V 17/00
16/268
5,071,455 A    12/1991 Abedi-Asl
(Continued)

FOREIGN PATENT DOCUMENTS

| CN | 101668996 A | 3/2010 |
|---|---|---|
| CN | 104819517 A | 8/2015 |

(Continued)

*Primary Examiner* — Minh Chau T Pham
(74) *Attorney, Agent, or Firm* — CANTOR COLBURN LLP

(57) ABSTRACT

A return air grille air purifier including an air filtration system including a media filter and a filter enhancement module. The filter enhancement module includes an ionization array configured to charge particles in an airstream passing through the filter enhancement module and towards the media filter. The return air grille air purifier also includes a first housing and a second housing configured to contain the air filtration system. The second housing contained within the first housing in a closed position and the second housing configured to move outward with the air filtration system at least partially out of the first housing in an open position. The media filter being removably accessible from the second housing in the open position.

20 Claims, 6 Drawing Sheets

(56) References Cited

U.S. PATENT DOCUMENTS

| | | | |
|---|---|---|---|
| 5,863,310 A * | 1/1999 | Brown | B01D 46/88 |
| | | | 55/DIG. 35 |
| 5,904,896 A | 5/1999 | High | |
| 6,716,406 B2 | 4/2004 | Reisfeld et al. | |
| 6,797,028 B2 * | 9/2004 | Duffy | F24F 13/28 |
| | | | 55/DIG. 35 |
| 6,849,107 B1 * | 2/2005 | Huffman | B01D 46/521 |
| | | | 261/80 |
| 6,941,630 B2 | 9/2005 | Wynn | |
| 7,497,771 B2 | 3/2009 | Choi et al. | |
| 7,802,443 B2 | 9/2010 | Wetzel | |
| 8,105,409 B2 * | 1/2012 | Mann | B01D 46/58 |
| | | | 55/501 |
| 8,685,150 B1 | 4/2014 | Caudle | |
| 9,877,580 B2 | 1/2018 | Stewart, Jr. et al. | |
| 10,047,972 B2 | 8/2018 | Jeong | |
| 2019/0120520 A1 | 4/2019 | Miyata et al. | |

FOREIGN PATENT DOCUMENTS

| | | |
|---|---|---|
| CN | 105864996 A | 8/2016 |
| CN | 106679004 A | 5/2017 |
| CN | 107504571 A | 12/2017 |
| CN | 206959252 U | 2/2018 |
| CN | 208059224 U | 11/2018 |
| CN | 110410894 A | 11/2019 |
| CN | 110594874 A | 12/2019 |
| CN | 110894997 A | 3/2020 |
| CN | 210921597 U | 7/2020 |
| CN | 211177200 U | 8/2020 |
| EP | 0030400 A1 | 6/1981 |
| EP | 0348011 A2 | 12/1989 |
| EP | 1614972 A2 | 1/2006 |
| EP | 1562646 B1 | 4/2006 |
| EP | 1548375 B1 | 7/2011 |
| EP | 1915576 B1 | 1/2014 |
| EP | 2199695 B1 | 5/2018 |
| EP | 3336444 B1 | 9/2019 |
| JP | 2790484 B2 | 8/1998 |
| JP | 2011174706 A | 9/2011 |
| KR | 101723139 B1 | 4/2017 |
| WO | 2010007866 A1 | 1/2010 |

* cited by examiner

RETURN AIR GRILLE AIR PURIFIER

CROSS-REFERENCE TO RELATED APPLICATIONS

This application claims the benefit of U.S. provisional application No. 63/080,507 filed Sep. 18, 2020, the disclosure of which is incorporated herein by reference in its entirety.

BACKGROUND

The embodiments herein generally relate to air filtration systems and more specifically, filters for electrostatic air filtration systems and installation thereof.

In air filtration systems, for example, electrically enhanced air filtration systems, electrostatic filters installed in the systems collect impurities in an airflow through the system before the airflow is circulated through a space such as a home or other building. Such filters are conventionally installed directly in or adjacent to furnaces, which makes removal of the filter and installation of a replacement filter difficult when the furnace is located in an attic or other difficult to reach locations.

BRIEF DESCRIPTION

According to one embodiment, a return air grille air purifier including: an air filtration system including: a media filter; and a filter enhancement module including an ionization array configured to charge particles in an airstream passing through the filter enhancement module and towards the media filter; a first housing; and a second housing configured to contain the air filtration system, the second housing contained within the first housing in a closed position, the second housing configured to move outward with the air filtration system at least partially out of the first housing in an open position, the media filter being removably accessible from the second housing in the open position.

In addition to one or more of the features described above, or as an alternative, further embodiments of may include a hinge mechanism operably connected to the second housing, the hinge mechanism being configured to allow the second housing to hinge outward with the air filtration system at least partially out of the first housing in the open position and hinge inward back into the first housing in the closed position.

In addition to one or more of the features described above, or as an alternative, further embodiments of may include that the hinge mechanism further includes: a hinge bar operably connecting the second housing to the first housing, the second housing configured to rotate about the hinge bar.

In addition to one or more of the features described above, or as an alternative, further embodiments of may include that the hinge mechanism further includes: a biasing mechanism configured to bias a rotation of the second housing about the hinge bar.

In addition to one or more of the features described above, or as an alternative, further embodiments of may include that the biasing mechanism includes one or more torsional springs.

In addition to one or more of the features described above, or as an alternative, further embodiments of may include that the second housing further includes: a first side; a second side opposite the first side; a third side; a fourth side opposite the third side; and an access opening locating in the first side.

In addition to one or more of the features described above, or as an alternative, further embodiments of may include that the hinge mechanism is located proximate the second side.

In addition to one or more of the features described above, or as an alternative, further embodiments of may include that the second housing further includes: an inlet side; and an outlet side located opposite the inlet side. The first side, the second side, the third side, and the fourth side circumferentially extend from the inlet side to the outlet side. The airstream is configured to enter through the inlet side and exit through the outlet side, passing through the air filtration system.

In addition to one or more of the features described above, or as an alternative, further embodiments of may include that the hinge mechanism is located proximate the outlet side.

In addition to one or more of the features described above, or as an alternative, further embodiments of may include that the air filtration system is disconnected from a power source in the open position.

According to another embodiment, a heating, ventilation, and cooling system including is provided. The heating, ventilation, and cooling system including: a furnace; an air return duct fluidly connected to the furnace; a return air grille air purifier fluidly connected to the furnace through the air return duct, the return air grille air purifier including: an air filtration system including: a media filter; and a filter enhancement module including an ionization array configured to charge particles in an airstream passing through the filter enhancement module and towards the media filter; a first housing; and a second housing configured to contain the air filtration system, the second housing contained within the first housing, in a closed position, the second housing configured to move outward with the air filtration system at least partially out of the first housing in an open position, the media filter being removably accessible from the second housing in the open position.

In addition to one or more of the features described above, or as an alternative, further embodiments of may include that the return air grille air purifier further includes: a hinge mechanism operably connected to the second housing, the hinge mechanism being configured to allow the second housing to hinge outward with the air filtration system at least partially out of the first housing in the open position and hinge inward back into the first housing in the closed position.

In addition to one or more of the features described above, or as an alternative, further embodiments of may include that the hinge mechanism further includes: a hinge bar operably connecting the second housing to the first housing, the second housing configured to rotate about the hinge bar.

In addition to one or more of the features described above, or as an alternative, further embodiments of may include that the hinge mechanism further includes: a biasing mechanism configured to bias a rotation of the second housing around the hinge bar.

In addition to one or more of the features described above, or as an alternative, further embodiments of may include that the biasing mechanism includes one or more torsional springs.

In addition to one or more of the features described above, or as an alternative, further embodiments of may include that the second housing further includes: a first side; a second side opposite the first side; a third side; a fourth side opposite the third side; and an access opening locating in the first side.

In addition to one or more of the features described above, or as an alternative, further embodiments of may include that the hinge mechanism is located proximate the second side.

In addition to one or more of the features described above, or as an alternative, further embodiments of may include that the second housing further includes: an inlet side; and an outlet side located opposite the inlet side. The first side, the second side, the third side, and the fourth side circumferentially extend from the inlet side to the outlet side. The airstream is configured to enter through the inlet side and exit the through outlet side, passing through the air filtration system.

In addition to one or more of the features described above, or as an alternative, further embodiments of may include the hinge mechanism is located proximate the outlet side.

In addition to one or more of the features described above, or as an alternative, further embodiments of may include that the air filtration system is disconnected from a power source in the open position.

Technical effects of embodiments of the present disclosure include utilizing a filter enhancement module (FEM) in a return air duct of a furnace. The FEM being configured to move into a housing to a closed position and out of a housing to an open position so that the filter is accessible for easy changing. The FEM module automatically disconnects from a power source when the FEM is moved to an open position.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
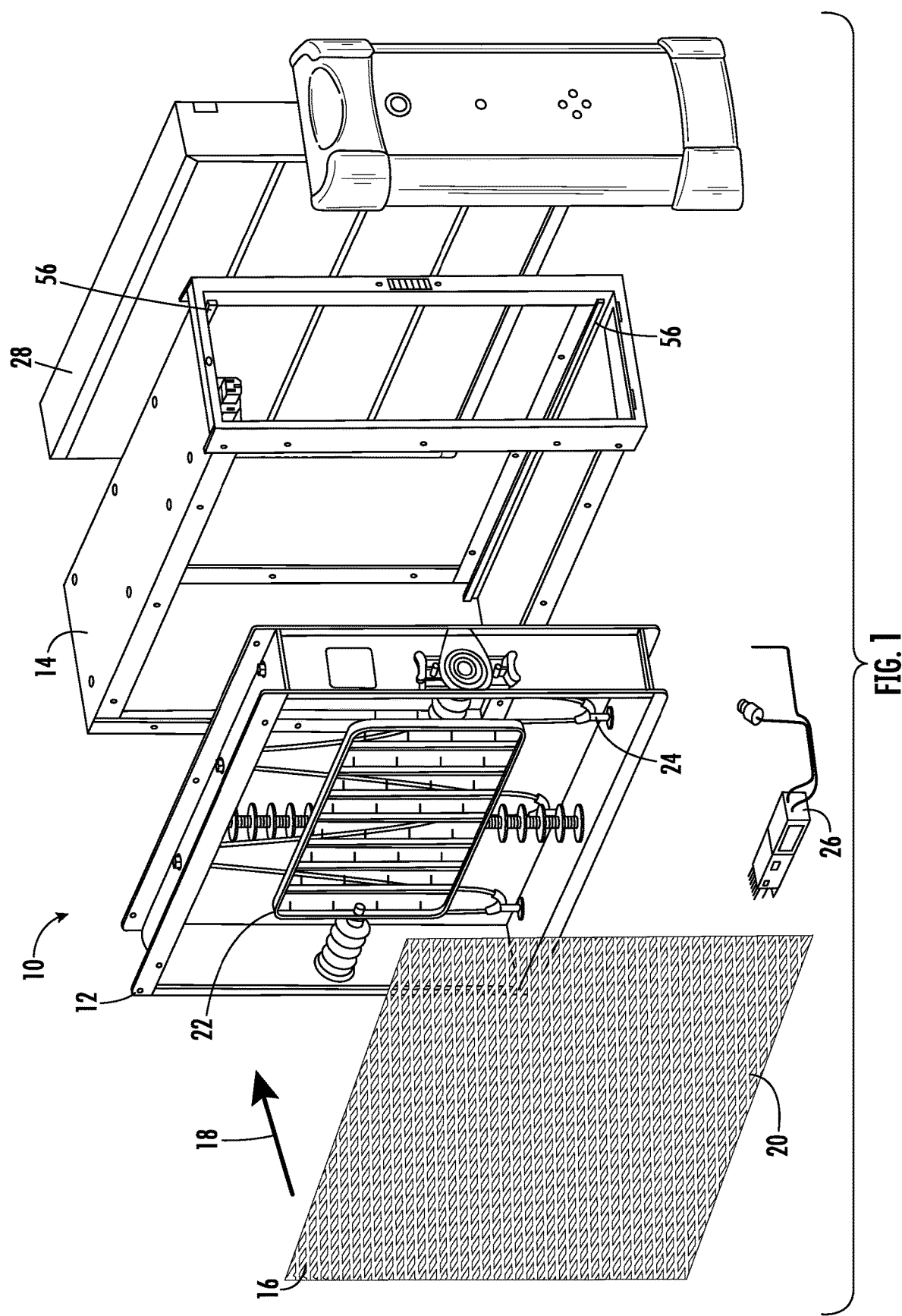
FIG. 1 is a schematic illustration of an air filtration system, according to an embodiment of the present disclosure.

Referring to FIG. 1, an exploded view an air filtration system 10 is illustrated and is utilized in various embodiments of the present disclosure. As shown in FIG. 1, the air filtration system 10 may be an electrically enhanced air filtration system 10, but it is to be appreciated that utilization of the present invention with other types of air filtration systems 10 having replaceable filters is contemplated within the present scope.

The air filtration system 10 includes a filter enhancement module (FEM) 12, shown in FIG. 1. As shown in FIG. 1, at an upstream end 16 of the FEM 12 (e.g., relative to an airflow direction 18 of air through the air filtration system 10) may be a safety screen 20, which, when incorporated, may act as an upstream ground for the FEM 12. Downstream of the safety screen 20, when incorporated, may be an ionization array 22, and a field-generating array 24 (e.g., located downstream of the ionization array 22). The ionization array 22 may include an array of points sufficiently sharp such as to produce corona discharge when a predetermined voltage is applied. For example, the ionization array 22 may include a plurality of thin wires, barbed wires, or any structure capable of producing the corona needed to yield ions. The field-generating array 24 and the ionization array 22 may both be connected to and powered by a high voltage power supply 26. The FEM 12 may be located and secured in a frame 14 of the air filtration system 10. A media filter 28 may be disposed in the frame 14 downstream of the field-generating array 24.

Figure 2:
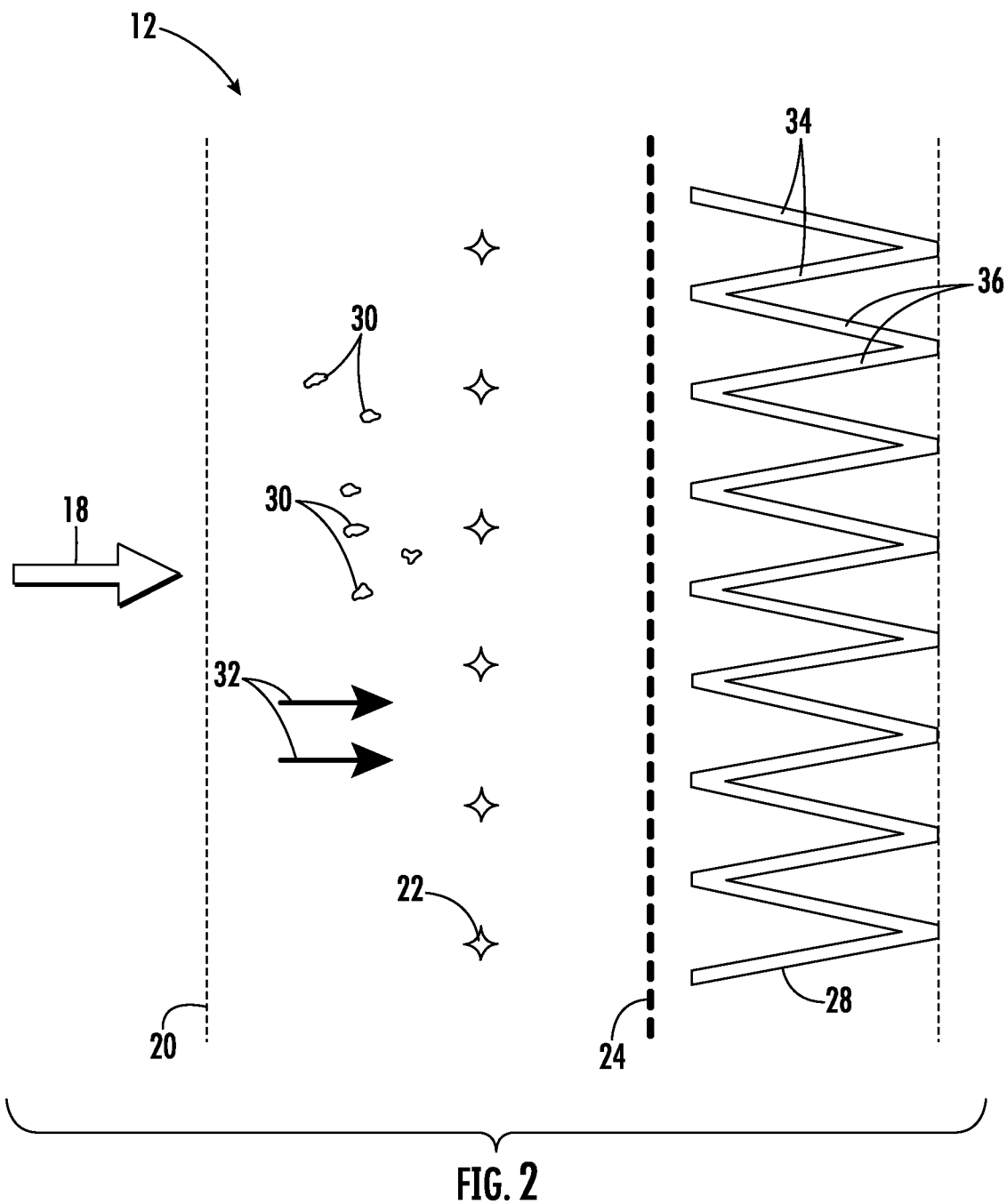
FIG. 2 is a schematic cross-sectional view of the air filtration system of FIG. 1, according to an embodiment of the present disclosure.

Referring now to FIG. 2, when the power supply 26 is activated, the ionization array 22 may charge particles 30 in an airstream 32 passing through the FEM 12 and towards the media filter 28 (e.g., by ionizing the air molecules, which then transfer their charge to the particles 30). The voltage across the field-generating array 24 may polarize a plurality of media fibers 34 of the media filter 28, which in some embodiments causes the charged particles 30 to be attracted to and captured by the media fibers 34. In other embodiments, the ionized gas (air) may charge the filter media (e.g., which may render the fibers electrostatically attractive to the particles 30 whether they be charged or not).

Figure 3:
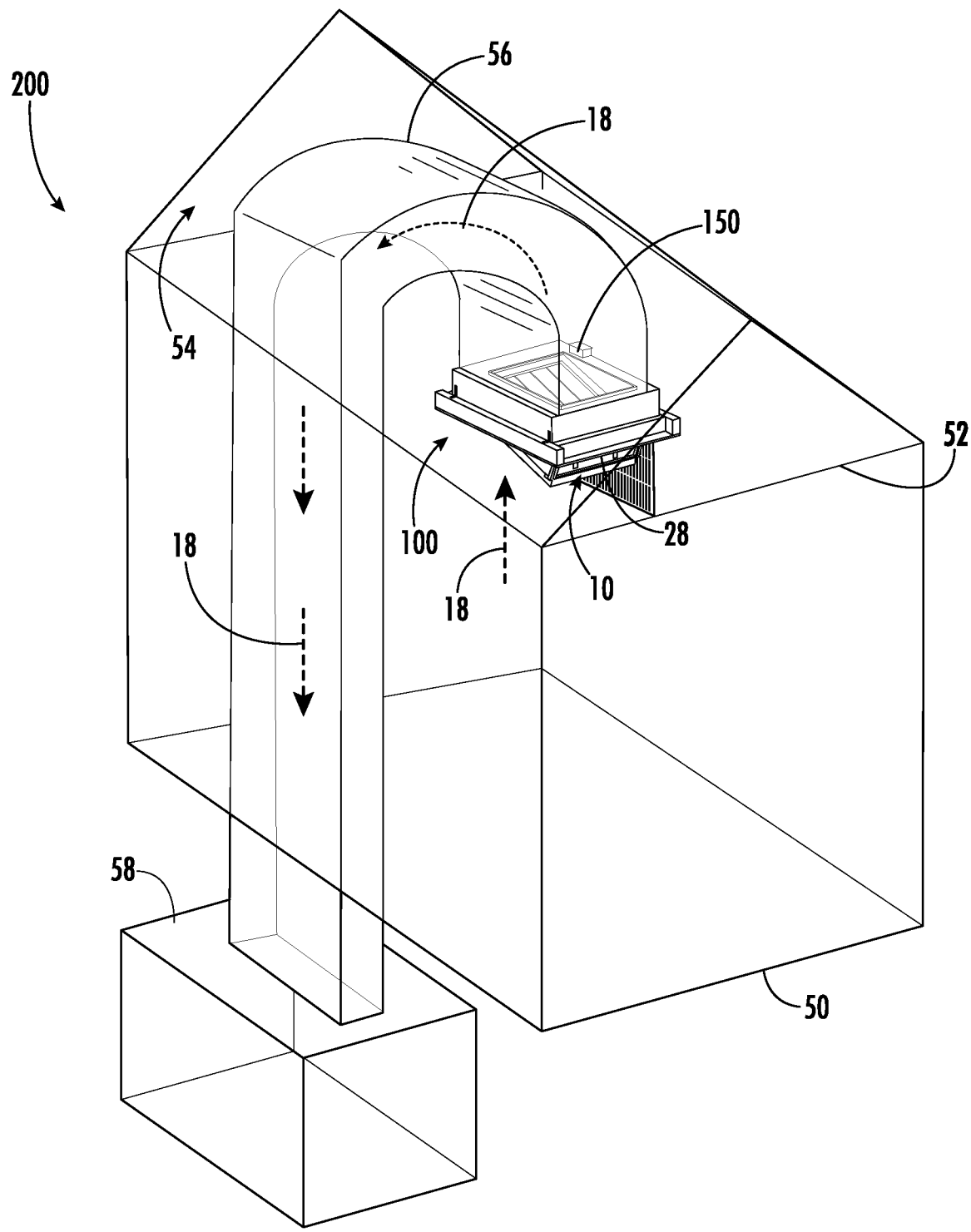
FIG. 3 is a schematic view of a heating, ventilation, and cooling system, according to an embodiment of the present disclosure.

Referring now to FIG. 3, with continued reference to FIGS. 1 and 2, an installation location of a return air grille air purifier 100 including the air filtration system 10 of FIGS. 1 and 2 is illustrated, in accordance with an embodiment of the present disclosure. The return air grille air purifier 100 may be part of a heating, ventilation and cooling (HVAC) system 200. As illustrated in FIG. 3, the return air grille air purifier 100 may be fluidly connected to a furnace 58 through an air return duct 56 that may be configured to return air to the furnace 58. The return air grille air purifier 100 may be located a ceiling 52 of a building 50. The air return duct 56 may be fluidly connected to the furnace 58. The return air grille air purifier 100 may be fluidly connected to the air return duct 56. In one embodiment, the return air grille air purifier 100 may be located in a ceiling 52 adjacent to an attic 54 of the building 50. For example, the air return duct 56 may extend from the attic 54 to the furnace 58. It is understood that while the return air grille air purifier 100 is illustrated as being located in a ceiling 52 adjacent to the attic 54, the return air grille air purifier 100 may be located in any wall of the building 50. Further, it is understood that while the return air grille air purifier 100 is illustrated as being located in a horizontal wall (e.g., the ceiling 52) adjacent to the attic 54, the return air grille air purifier 100 may be located in a vertical wall of the building 50. In an embodiment, the building 50 may be a residential building, such as for example a home.

As illustrated in FIG. 3, the return air grille air purifier 100 may include in an open position. While in the open position, the air filtration system 10 may hinge outward so as to make the media filter 28 removably accessible (e.g., capable of being removed and replaced). For safety purposes, the return air grille air purifier 100 may be configured to be disconnected from a power source 150 when the air filtration system 10 hinges outward to the open position and then reconnect to a power source 150 when back the air filtration system 10 hinges back inward into a closed position. When in the closed position, the air filtration system 10 may be located fully inside of the first housing 110 (depicted in FIG. 4) of the return air grille air purifier 100. For example, the first housing 110 may be configured to act as "filter door" that seals the media filter 28 off from the outside environment or any airflow not going through the airflow direction 18. This may advantageously avoid the need for a separate filter door on the second housing 20, which may save cost and eliminate a potential safety hazard in handling an additional part (e.g., the filter door) while on a ladder when changing the media filter 28.

To further reduce potential safety hazards, the return air grille air purifier 100 may utilize a door limit switch 152 to disconnect the power supply 26 of the air filtration system 10 from the power source 150 when the air filtration system 10 is in the open position and then reconnect the air filtration system 10 to the power source 150 when the air filtration system 10 is in the closed position. The door limit switch 152 may be enclosed in a junction electrical box where the wires through the conduit cord may be routed so the unit can be hooked up to electrical terminals of the return air grille air purifier 100. For example, the door limit switch 152 may be configured to include a button 154 such that when the second housing 120 is moved to the open position, the button 154 on the door limit switch 152 may open so that the power is removed from the return air grille air purifier 100. Conversely, when the second housing 120 is moved to the closed position, the button 154 on the door limit switch 152 may be pushed to close so that power is provided to the return air grille air purifier 100.

Figure 4:
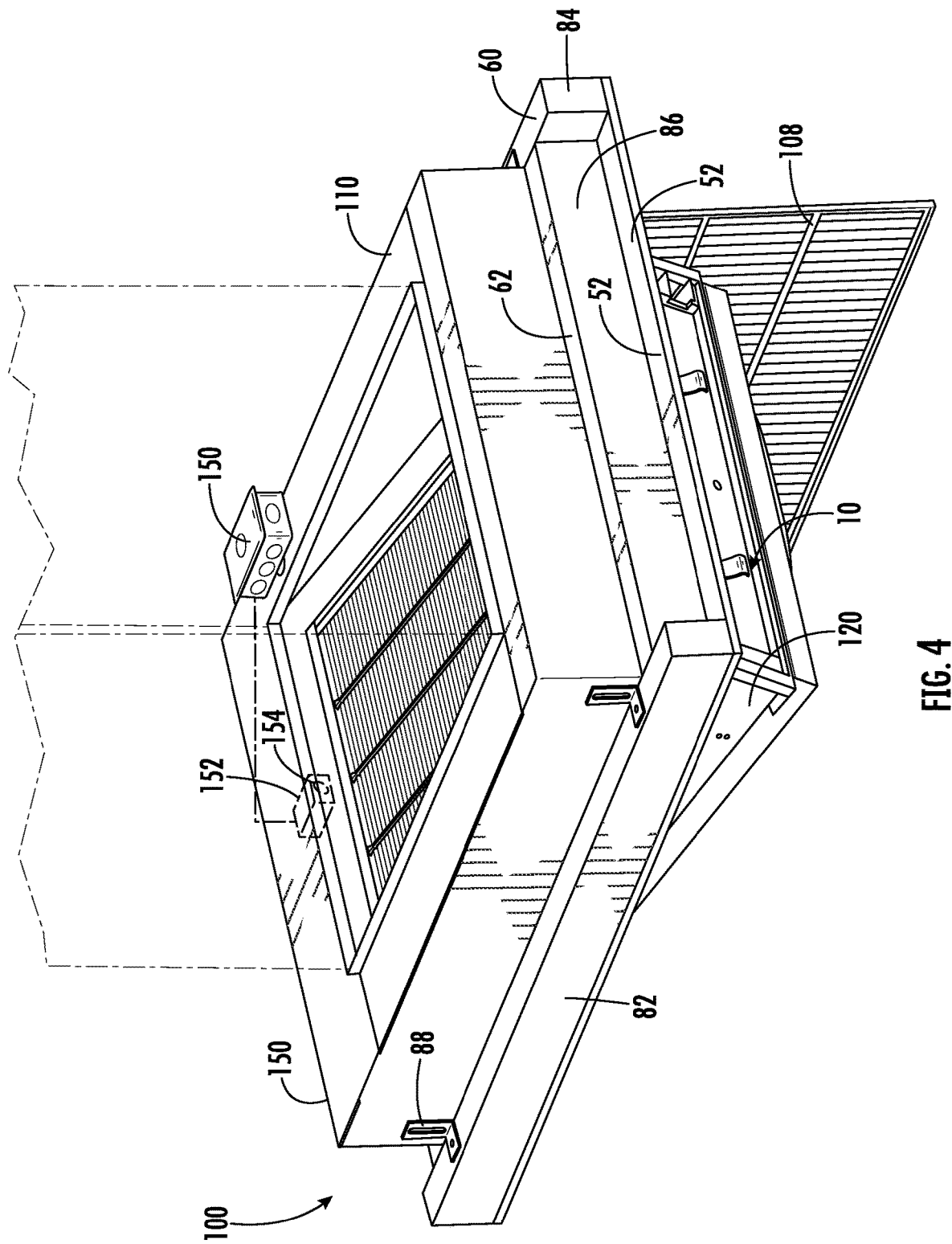
FIG. 4 is a schematic top view of a return air grille air purifier, according to an embodiment of the present disclosure.
Figure 5:
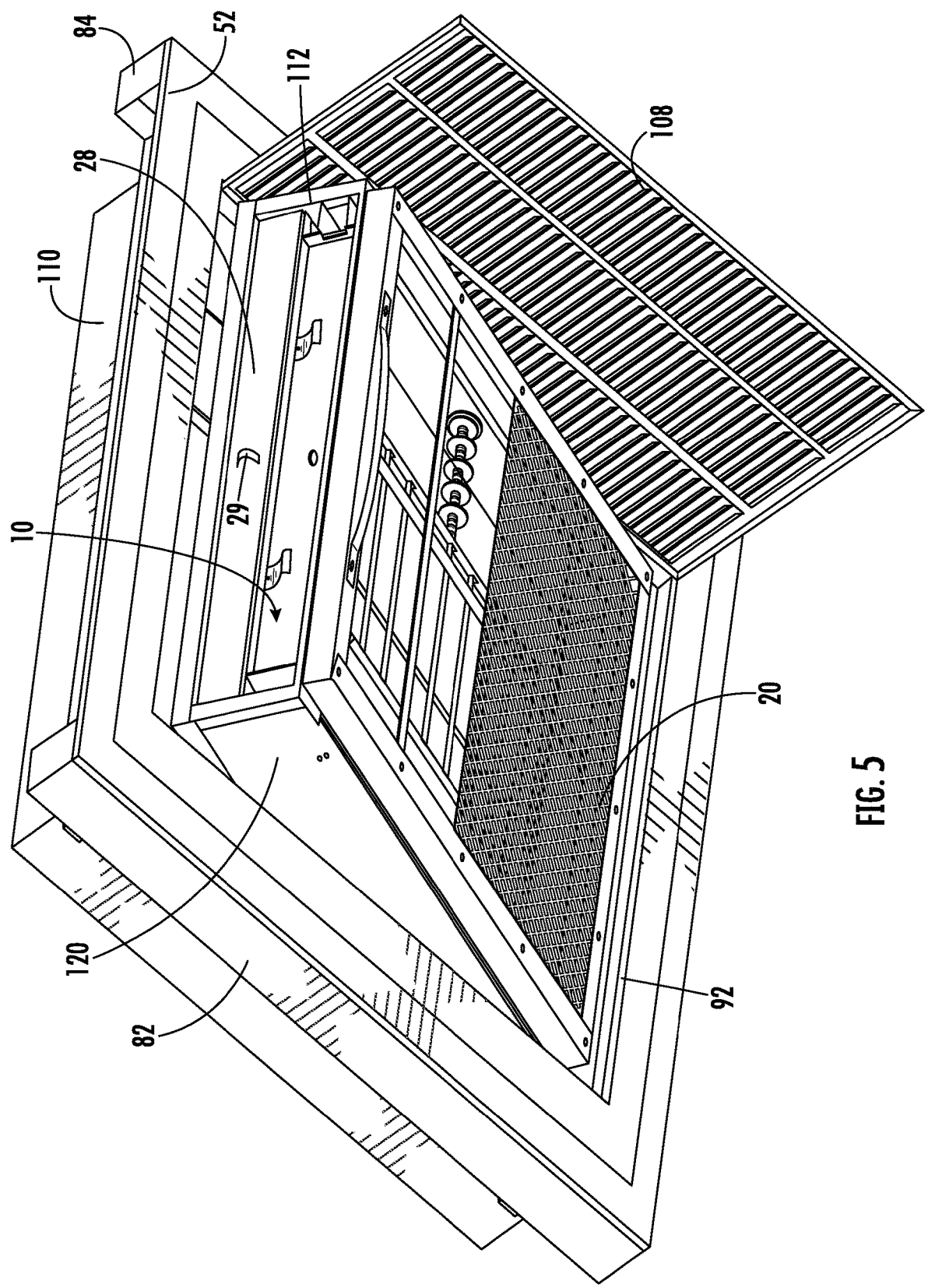
FIG. 5 is a schematic bottom view of the return air grille air purifier, according to an embodiment of the present disclosure.

Referring now to FIGS. 4 and 5, with continued reference to FIGS. 1-3, an enlarged top view of the return air grille air purifier 100 is illustrated in FIG. 4 and an enlarged bottom view of the return air grille air purifier 100 is illustrated in FIG. 5, in accordance with an embodiment of the present disclosure. As shown in FIGS. 4 and 5, the return air grille air purifier 100 may include a first housing 110 and a second housing 120. The first housing 110 may be configured to contain the second housing 120 and the second housing 120 may be configured to contain the air filtration system 10. The second housing 120 may be configured to move outward with the air filtration system 10 at least partially out of the first housing 110 (e.g., in the open position), such that a media filter 28 is removably accessible. More specifically, the second housing 120 may be configured to hinge outward with the air filtration system 10, such that a media filter 28 is removably accessible, as illustrated in FIG. 4. The second housing 120 may be operably connected to the first housing 110 to allow the second housing 120 to hinge outward from the first housing 110.

As illustrated in FIG. 4, the first housing 110 may be mounted to a first ceiling joist 82 of the ceiling 52 and a second ceiling joist 84 of the ceiling 52. The first housing 110 may be mounted to the first ceiling joist 82 and the second ceiling joist 84 via one or more brackets 88. One or more cross beams 86 may be attached to the first ceiling joist 82 and the second ceiling joist 84 for added support. The one or more cross beams 86 may extend from the first ceiling joist 82 to the second ceiling joist 84 to fully frame an opening 92 (see FIG. 5) in the ceiling 52 for the return air grille air purifier 100. The opening 92 may include a return inlet grate 108 that may be configured to hinge out of the opening 92 to allow the second housing 120 and the air filtration system 10 to hinge outward. When the second housing 120 and the air filtration system 10 are hinged back inward into the first housing 110, the return inlet grate 108 may be hinged to a closed position back into the opening 92, such that the return inlet grate 108 is decorative, protects people from accessing the air filtration system while in operation, and protects the air filtration system 10 from debris (e.g., in addition to the protection already offered by the safety screen 20). The safety screen 20 may go all the way across the second house 120 to provide protection to prevent the homeowner from accidently touching the FEM 12 when replacing the media filter 28.

As shown in FIG. 5, the second housing 120 may include an access opening 112 that may also hinge outward to allow the media filter 28 to become accessible for replacing. The media filter 28 may include a pull loop 29 (e.g., which may be used to pull the media filter 28 out of the air filtration system 10).

Figure 6:
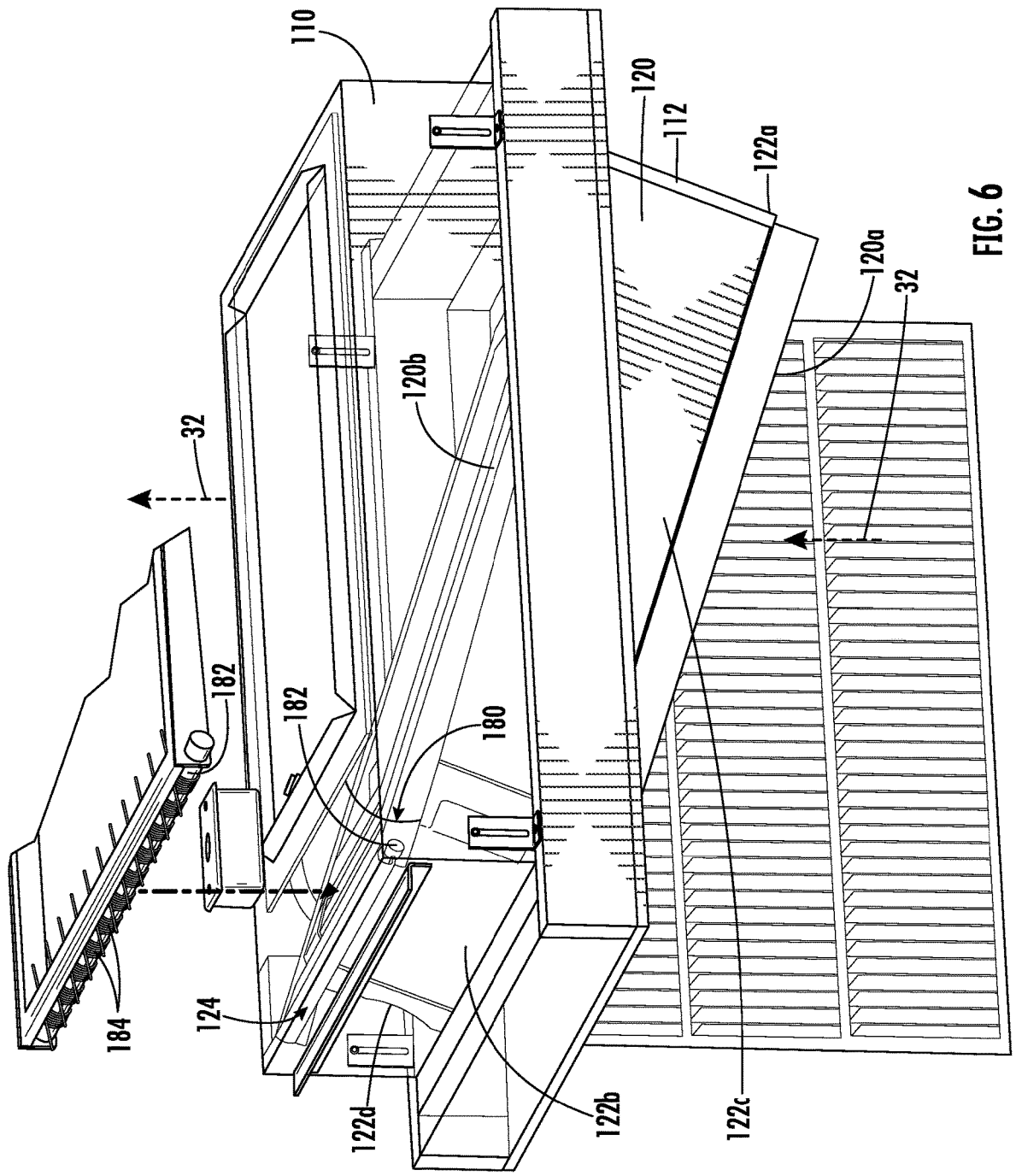
FIG. 6 is a schematic view of the return air grille air purifier, according to an embodiment of the present disclosure.

Referring now to FIG. 6, with continued reference to FIGS. 1-5, a view of a hinge mechanism 180 of the return air grille air purifier 100 is illustrated, in accordance with an embodiment of the present disclosure. As shown in FIG. 6, the hinge mechanism 180 may be configured to allow the second housing 120 to hinge outward with the air filtration system 10 at least partially out of the first housing 110 (e.g., in the open position) and hinge inward back into the first housing 110 (e.g., in the closed position).

The hinge mechanism 180 may include a hinge bar 182 (e.g., that may operably connect the second housing 120 to the first housing 110). The second housing 120 may be configured to hinge or rotate about the hinge bar 182. The hinge mechanism 180 may also include a biasing mechanism 184 (e.g., configured to bias the rotation of the second housing 120 about the hinge bar 182). The biasing mechanism 184 may be configured to bias (i.e., slow or restrict) the rotation of the second housing 120 about the hinge bar 182 such that the second housing 120 gently and/or slowly hinges outward rather than just falling outward. The biasing mechanism 184 may also be configured to bias (i.e., slow or restrict) the rotation of the second housing 120 about the hinge bar 182 such that the second housing 120 is mechanically assisted to hinge back inward. The biasing mechanism 184 may include one or more torsional springs.

The second housing 120 may include an inlet side 120a and an outlet side 120b opposite the inlet side 120a. The airstream 32 may be configured to go through the inlet side 120a into the air filtration system 10 located within the second housing 120 and then exits the second housing 120 via the outlet side 120b. The second housing 120 may include a first side 122a extending from the inlet side 120a to the outlet side 120b, a second side 122b extending from the inlet side 120a to the outlet side 120b, a third side 122c extending from the inlet side 120a to the outlet side 120b, and a fourth side 122d extending from the inlet side 120a to the outlet side 120b. In other words, the first side 122a, the second side 122b, the third side 122c, and the fourth side 122d circumferentially extend from the inlet side 120a to the outlet side 120b. The second side 122b may be located opposite the first side 122a and the fourth side 122d may be located opposite the third side 122c. The access opening 112 may be located in the first side 122a. The access opening 112 of the second housing 120 may be located opposite the hinge mechanism 180.

In an embodiment, the hinge mechanism 180 may be operably connected to the second housing 120 proximate the second side 122b. In another embodiment, the hinge mechanism 180 may be operably connected to the second housing 120 at the second side 122b. In another embodiment, the hinge mechanism 180 may be operably connected to the second housing 120 proximate the outlet side 120b. In another embodiment, the hinge mechanism 180 may be operably connected to the second housing 120 at the outlet side 120b. In another embodiment, the hinge mechanism 180 may be operably connected to the second housing 120 proximate a corner 124 located where the second side 122b meets the outlet side 120b. In another embodiment, the hinge mechanism 180 may be operably connected to the second housing 120 at the corner 124 located where the second side 122b meets the outlet side 120b.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A return air grille air purifier comprising:
    an air filtration system comprising:
        a media filter; and
        a filter enhancement module comprising an ionization array configured to charge particles in an airstream passing through the filter enhancement module and towards the media filter;
    a first housing;
    a return inlet grate hingedly secured to the first housing, the return inlet grate covering an opening in the first housing in a closed position and allowing access to the opening in an open position; and
    a second housing configured to contain the air filtration system including the media filter and the filter enhancement module, the second housing contained within the first housing in a closed position, the second housing configured to move outward with the air filtration system at least partially out of the opening of the first housing in an open position, the media filter being removably accessible from the second housing in the open position.

2. The return air grille air purifier of claim 1, further comprising:
    a hinge mechanism operably connected to the second housing, the hinge mechanism being configured to allow the second housing to hinge outward with the air filtration system at least partially out of the first housing in the open position and hinge inward back into the first housing in the closed position.

3. The return air grille air purifier of claim 2, wherein the hinge mechanism further comprises:
    a hinge bar operably connecting the second housing to the first housing, the second housing configured to rotate about the hinge bar.

4. The return air grille air purifier of claim 3, wherein the hinge mechanism further comprises:
    a biasing mechanism configured to bias a rotation of the second housing about the hinge bar.

5. The return air grille air purifier of claim 4, wherein the biasing mechanism comprises one or more torsional springs.

6. The return air grille air purifier of claim 2, wherein the second housing further comprises:
    a first side;
    a second side opposite the first side;
    a third side;
    a fourth side opposite the third side; and
    an access opening locating in the first side.

7. The return air grille air purifier of claim 6, wherein the hinge mechanism is located proximate the second side.

8. The return air grille air purifier of claim 6, wherein the second housing further comprises:
    an inlet side; and
    an outlet side located opposite the inlet side, wherein the first side, the second side, the third side, and the fourth side circumferentially extend from the inlet side to the outlet side, and
    wherein the airstream is configured to enter through the inlet side and exit through the outlet side, passing through the air filtration system.

9. The return air grille air purifier of claim 8, wherein the hinge mechanism is located proximate the outlet side.

10. The return air grille air purifier of claim 1, wherein the air filtration system is disconnected from a power source in the open position.

11. A heating, ventilation, and cooling system comprising:
    a furnace;
    an air return duct fluidly connected to the furnace;
    a return air grille air purifier fluidly connected to the furnace through the air return duct, the return air grille air purifier comprising:
        an air filtration system comprising:
            a media filter; and
            a filter enhancement module comprising an ionization array configured to charge particles in an airstream passing through the filter enhancement module and towards the media filter;
        a first housing;
        a return inlet grate hingedly secured to the first housing, the return inlet grate covering an opening in the first housing in a closed position and allowing access to the opening in an open position; and
        a second housing configured to contain the air filtration system including the media filter and the filter enhancement module, the second housing contained within the first housing, in a closed position, the second housing configured to move outward with the air filtration system at least partially out of the opening of the first housing in an open position, the media filter being removably accessible from the second housing in the open position.

12. The heating, ventilation, and cooling system of claim 11, wherein the return air grille air purifier further comprises:
a hinge mechanism operably connected to the second housing, the hinge mechanism being configured to allow the second housing to hinge outward with the air filtration system at least partially out of the first housing in the open position and hinge inward back into the first housing in the closed position.

13. The heating, ventilation, and cooling system of claim 12, wherein the hinge mechanism further comprises:
a hinge bar operably connecting the second housing to the first housing, the second housing configured to rotate about the hinge bar.

14. The heating, ventilation, and cooling system of claim 13, wherein the hinge mechanism further comprises:
a biasing mechanism configured to bias a rotation of the second housing around the hinge bar.

15. The heating, ventilation, and cooling system of claim 14, wherein the biasing mechanism comprises one or more torsional springs.

16. The heating, ventilation, and cooling system of claim 12, wherein the second housing further comprises:
a first side;
a second side opposite the first side;
a third side;
a fourth side opposite the third side; and
an access opening locating in the first side.

17. The heating, ventilation, and cooling system of claim 16, wherein the hinge mechanism is located proximate the second side.

18. The heating, ventilation, and cooling system of claim 16, wherein the second housing further comprises:
an inlet side; and
an outlet side located opposite the inlet side, wherein the first side, the second side, the third side, and the fourth side circumferentially extend from the inlet side to the outlet side, and
wherein the airstream is configured to enter through the inlet side and exit the through outlet side, passing through the air filtration system.

19. The heating, ventilation, and cooling system of claim 18, wherein the hinge mechanism is located proximate the outlet side.

20. The heating, ventilation, and cooling system of claim 11, wherein the air filtration system is disconnected from a power source in the open position.

* * * * *